H. E. Pierce,

Making Matches.

No. 788. Reissued Aug. 2, 1859.

THE NORRIS PETERS CO., PHOTO-LITHO., WASHINGTON, D. C.

UNITED STATES PATENT OFFICE.

HENRY E. PIERCE, OF CHARLEMONT, MASSACHUSETTS.

IMPROVED MACHINE FOR MATTING THE ENDS OF MATCH-BLOCKS.

Specification forming part of Letters Patent No. 10,413, dated January 10, 1854; Reissue No. 788, dated August 2, 1859.

*To all whom it may concern:*

Be it known that I, HENRY E. PIERCE, of Charlemont, in the county of Franklin and State of Massachusetts, have invented a new and useful Machine for Matting the Ends of Match-Blocks, by which they are made to adhere together when split without the use of glue or other substance, as formerly used; and I do hereby declare that the following is a full, clear, and exact description of the construction and operation of the same, reference being had to the annexed drawings, forming a part of this specification, of which—

Figure 1:
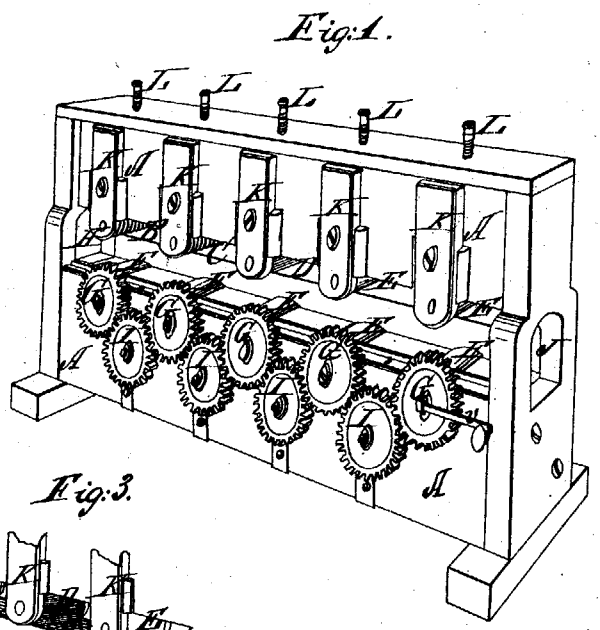
Figure 3:
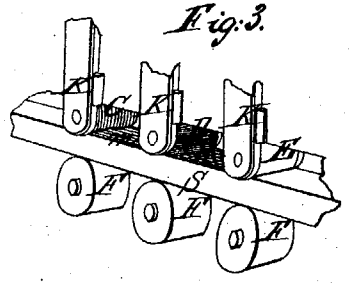
Figure 2:
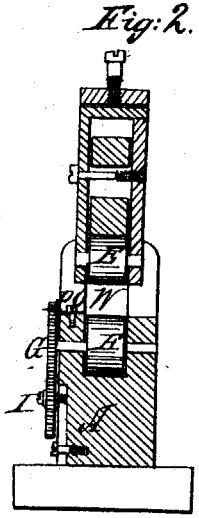

Figure 1 is a perspective view, Fig. 2 a transverse vertical section, and Fig. 3 an enlarged view, of the most important parts of the same.

A A is a strong frame, consisting of two upright pieces and two horizontal ones, all of which should be made of iron. Between the upper and lower part of frame-work A A is the open space W, extending the whole length.

H J are openings in the ends of the frame, communicating with the space W.

F F F F F are strong rollers firmly fastened in the frame below the space W, having their peripheries slightly elevated above the top of the frame-work in which they are fastened. These rollers are all connected together by the toothed wheels G G G I I I. When the crank or pulley V is turned, they all revolve in the same direction with a uniform motion, thus constituting a carriage by which the match-block S, Fig. 3 is drawn forward. In the upper part of the space W is a series of pressure-rollers, B C D E E, moving in bearings K K K K K. The height of these rollers is regulated by the set-screws L L L L L. The roller B is set at such a distance from E, beneath it, that when a match-block is placed between them it will press lightly upon it with sufficient force to enable the block to be moved along the space W when the crank or pulley is turned. It may be grooved or smooth.

C is a roller having its surface covered with small circular grooves, Fig. 3.

D is a roller of similar shape, but having its surface covered with small longitudinal grooves running parallel with its axis.

E is another roller, but the surface is smooth.

The operation of the machine is as follows: The match-block enters at the opening H, and as the crank or pulley V is turned the block S is drawn along between E and B to the grooved roller C. As it passes beneath C, power-compression is made upon it, and it comes out, leaving its surface covered with small longitudinal grooves. The block is then drawn forward under D, when compression is again made and the block comes out covered with transverse grooves at right angles with the former, as seen in Fig. 3. It next passes under the smooth roller E, when a more powerful compression is made and the rough surface is pressed down to an even, smooth state. The block passes out at the opening J, and the fibers at the ends are all matted together so finely that when the splitting process is performed the block will adhere without the use of glue or other substance. Since intercrushing the ends of fibers immediately in contact with the pressing-surface is required, it is plain that this may be accomplished by corrugations or indentations in any form, or even without them the smooth roller may be made to answer by regulating the degree of pressure by rigid or elastic pressure. It is also plain that the upper rollers may be geared to the lower ones for the purpose of getting a stronger pressure, and a machine may be used with but one pair of rollers, which can be changed at pleasure, or even with one roller, by placing the block upon a carriage and bringing the block in contact with the roller.

What I claim as my invention, and wish to secure by Letters Patent, is—

Matting the ends of match-blocks by pressure of a roller or rollers for the purpose set forth; and in this claim I wish to be understood that I do not confine myself to the precise arrangements of the parts herein described, but shall vary them at pleasure, while I attain the same ends by means substantially the same.

HENRY E. PIERCE.

Attest:

JOHN S. HOLLINGSHEAD,
GIDEON W. LARNER.